Feb. 20, 1934. J. EDGAR 1,947,466
THREAD TOOL GRINDING MACHINE
Filed Nov. 4, 1927 10 Sheets-Sheet 1

Inventor
John Edgar
By
Attys.

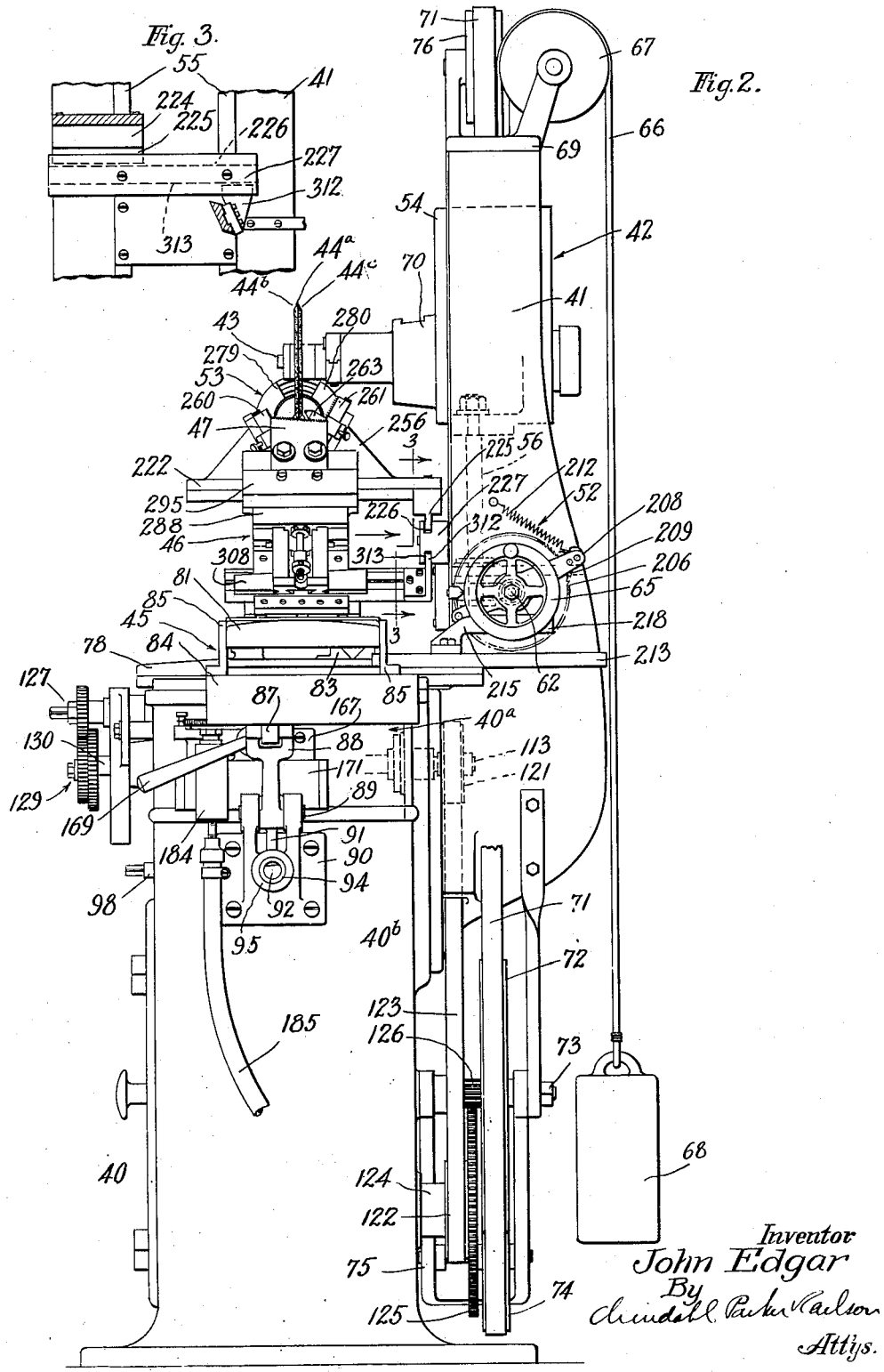

Inventor
John Edgar
By
Attys.

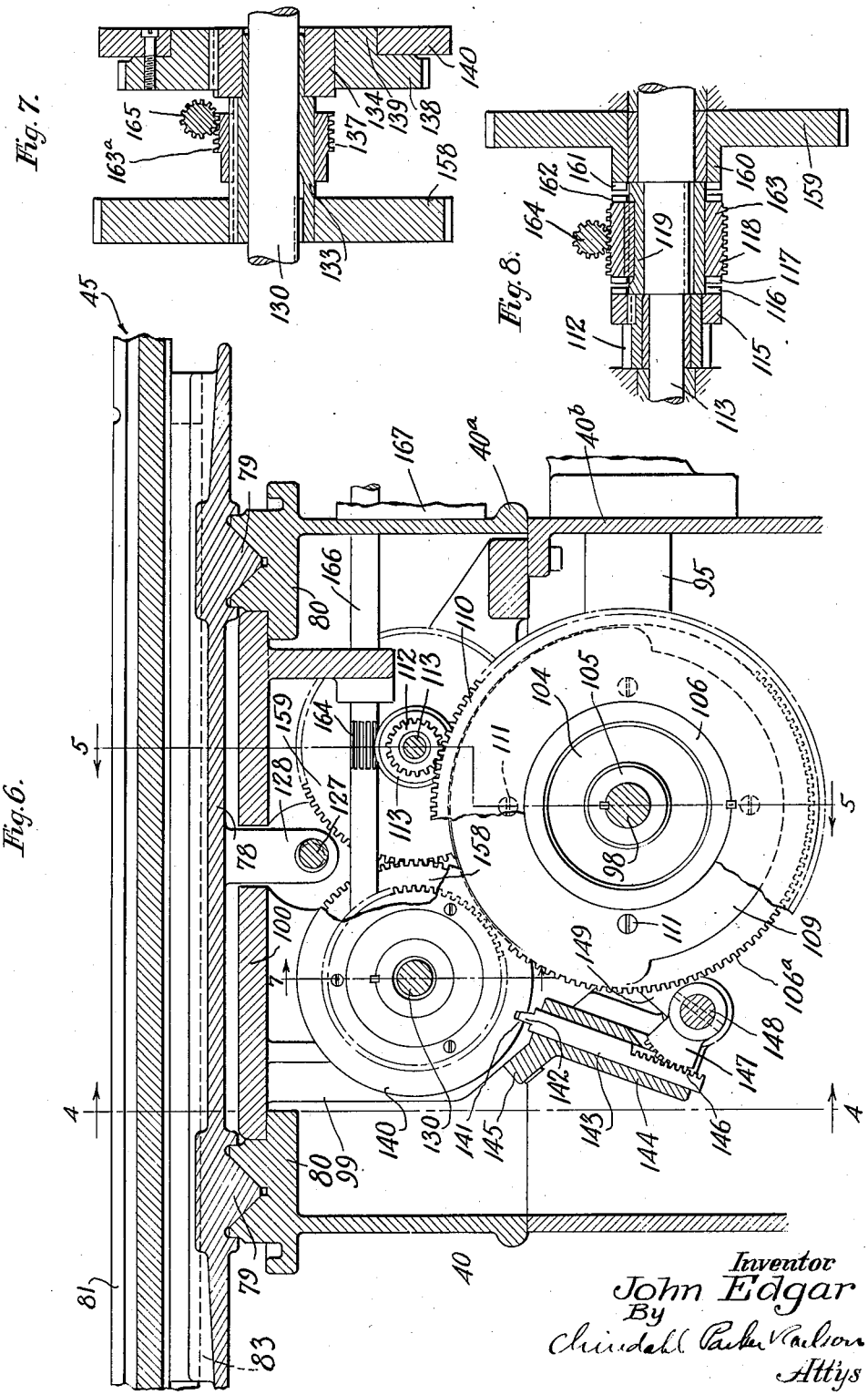

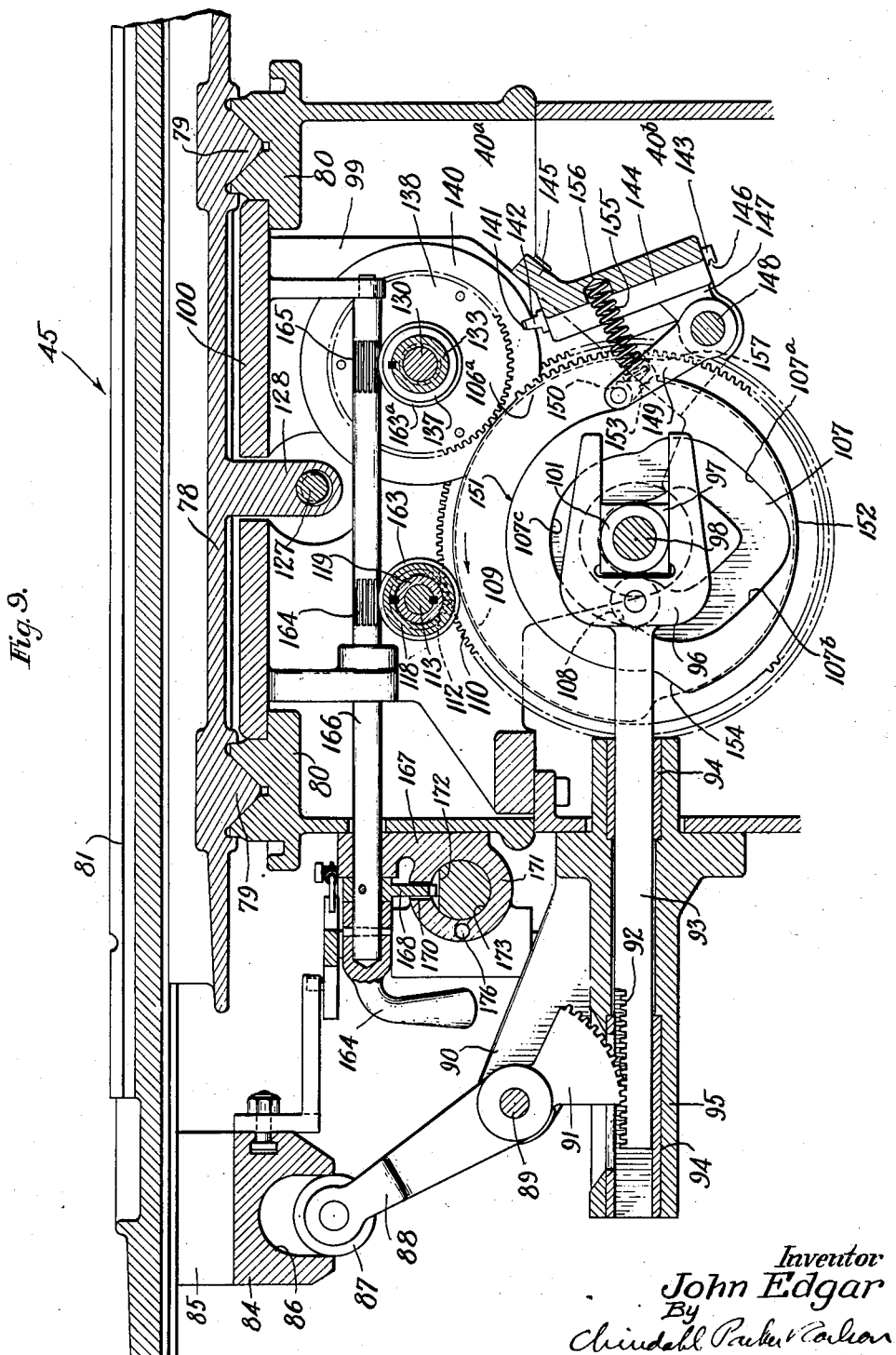

Feb. 20, 1934.                J. EDGAR                    1,947,466
                    THREAD TOOL GRINDING MACHINE
                    Filed Nov. 4, 1927        10 Sheets-Sheet 6
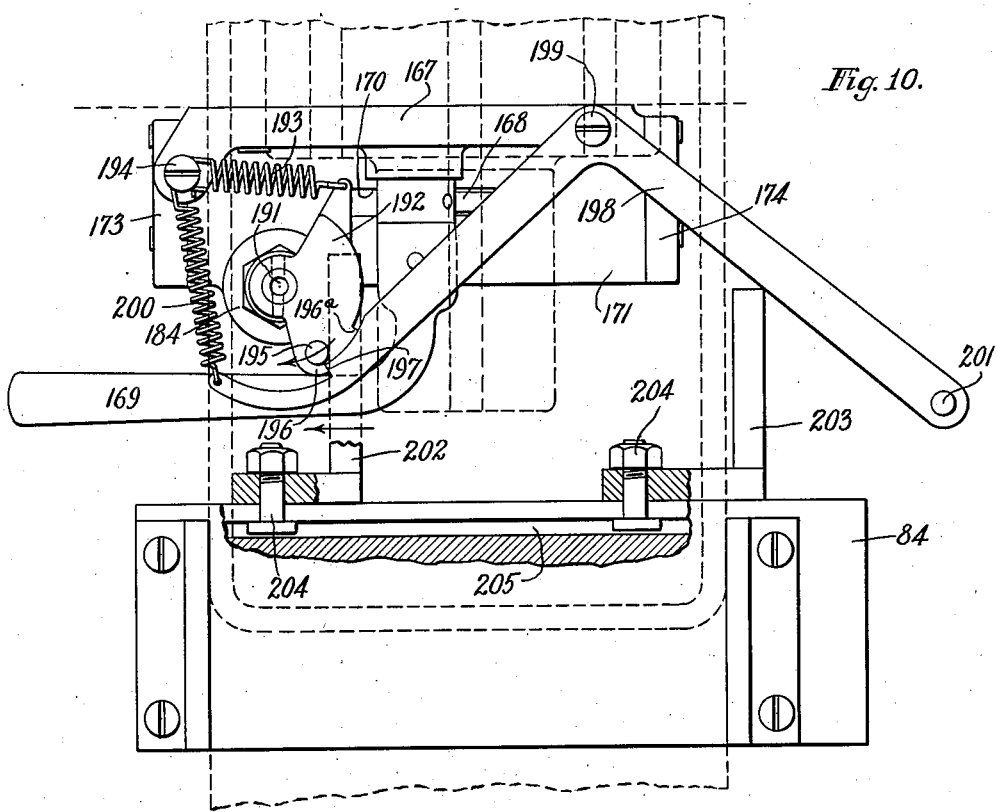
Fig. 10.
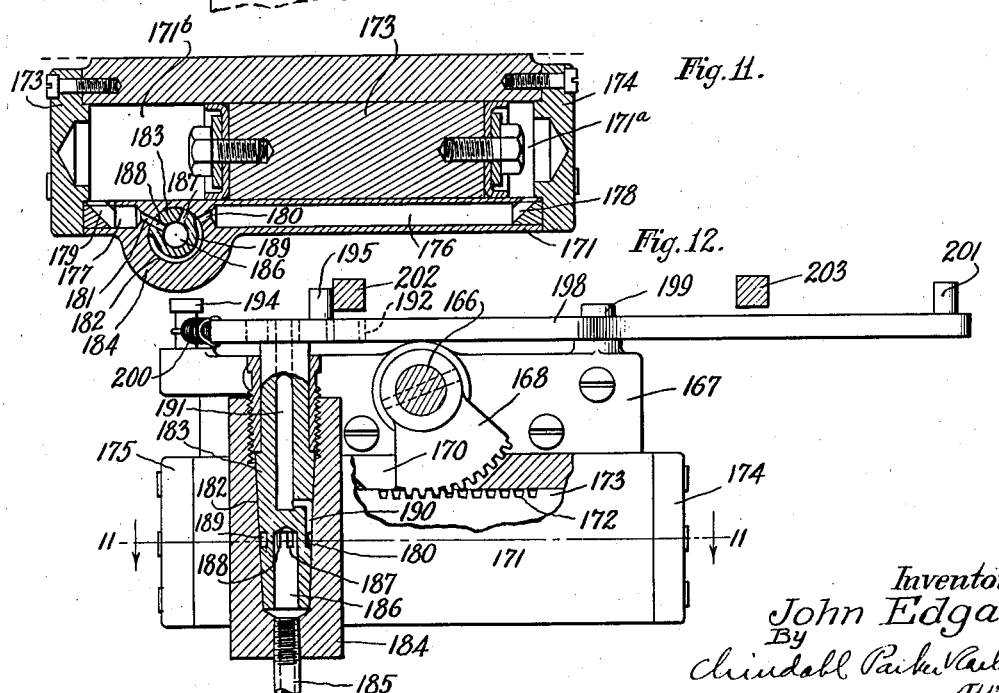
Fig. 11.
Fig. 12.
Inventor
John Edgar
By
Chindahl Parker Carlson
Attys

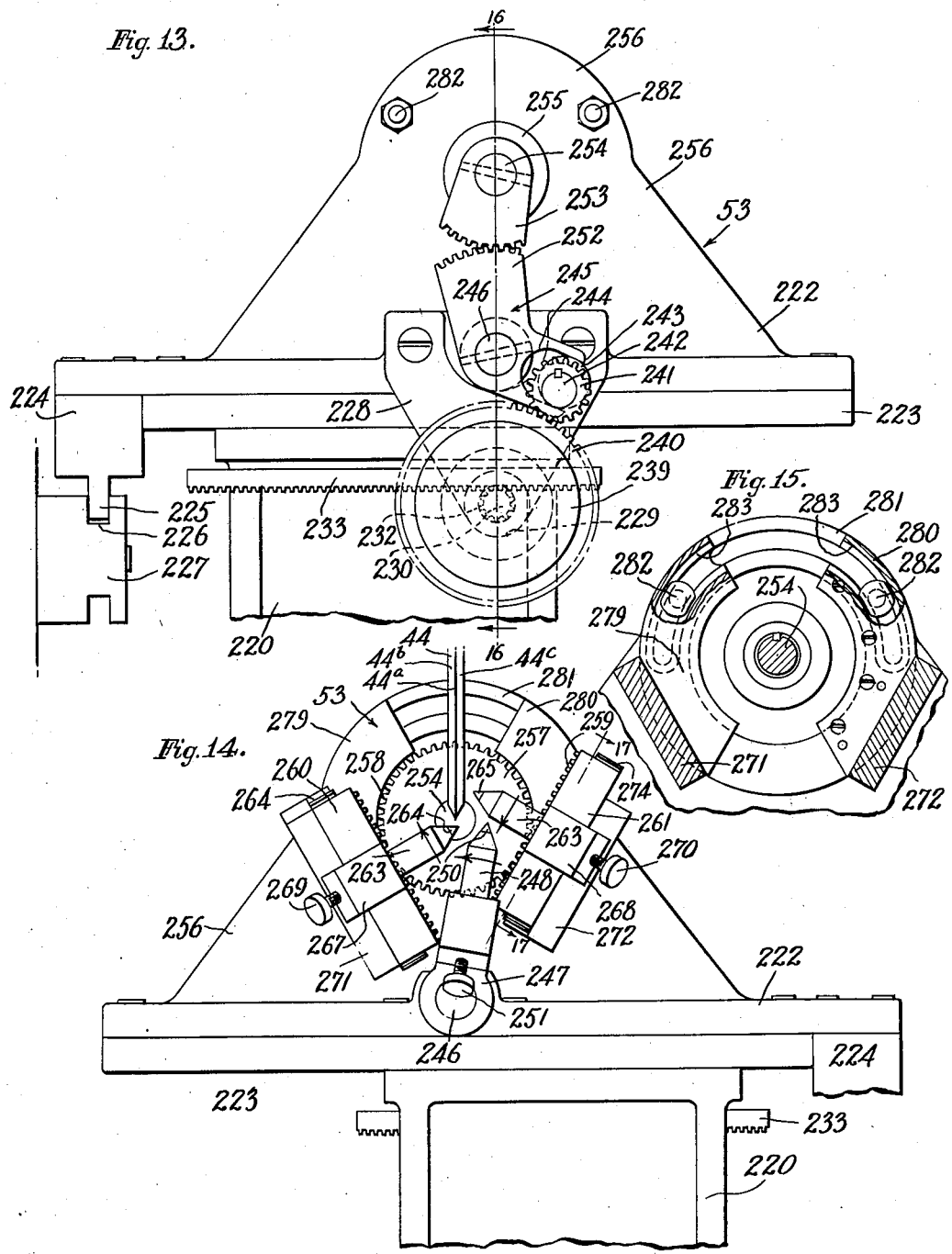

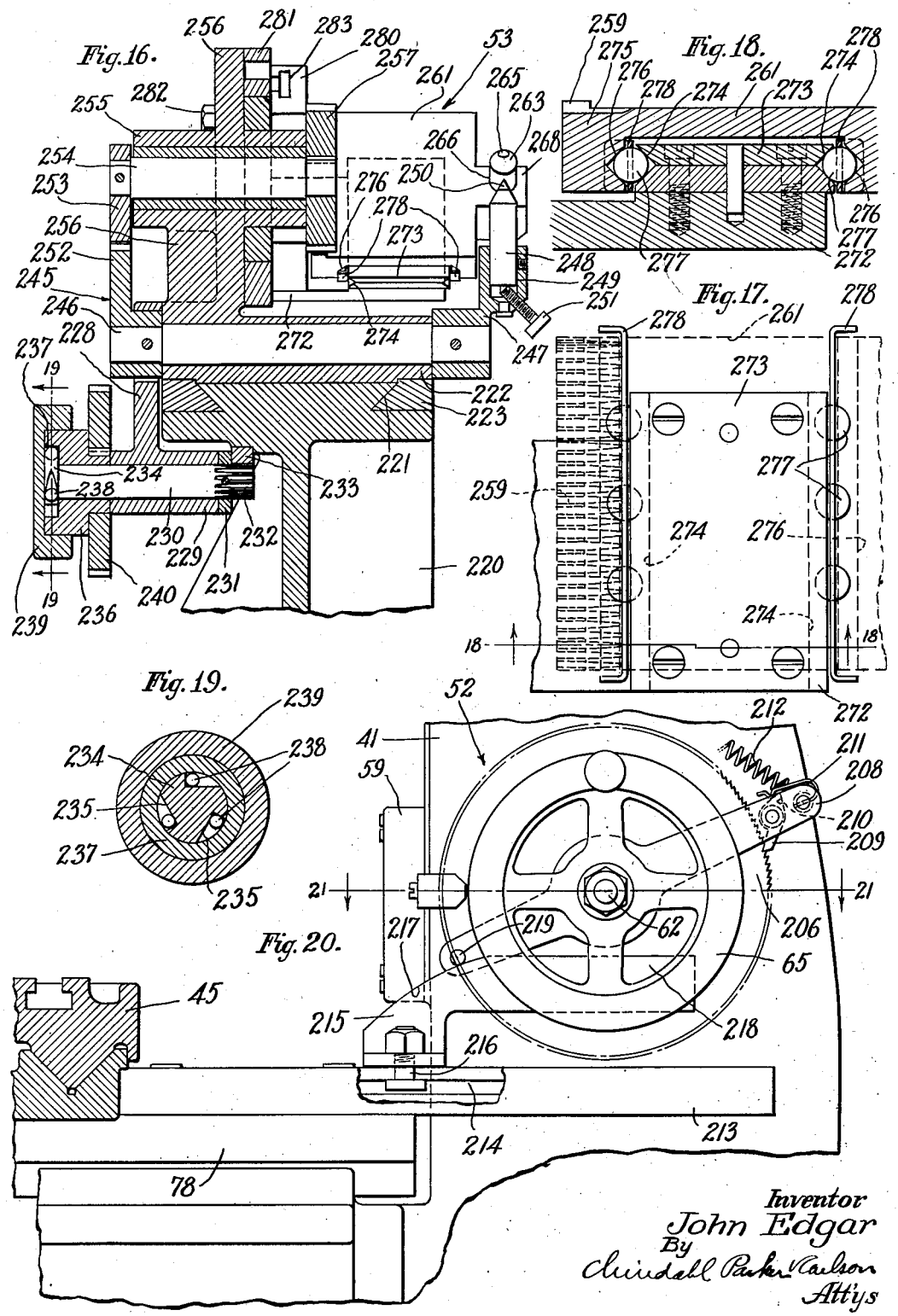

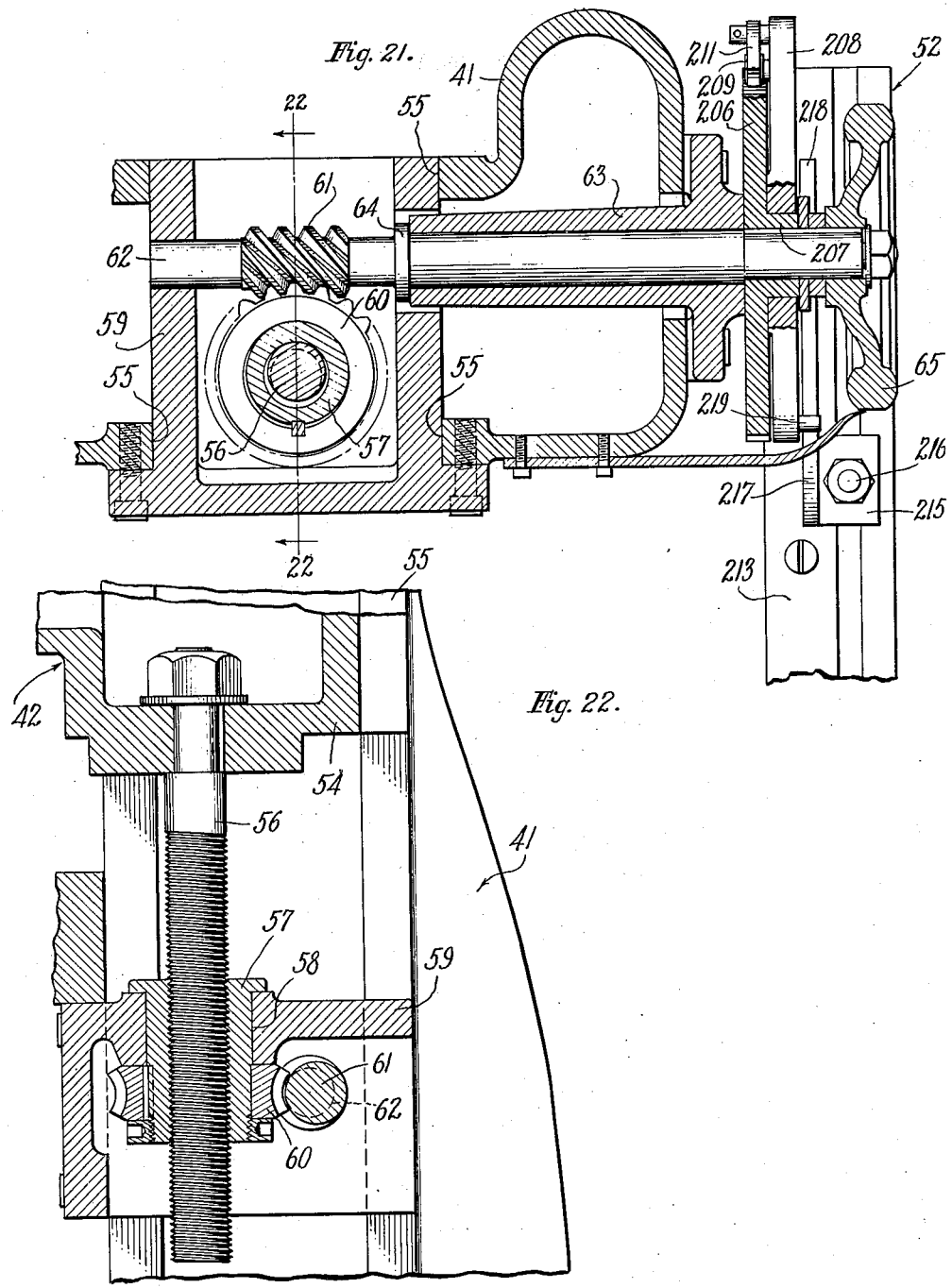

Feb. 20, 1934. J. EDGAR 1,947,466
THREAD TOOL GRINDING MACHINE
Filed Nov. 4, 1927 10 Sheets-Sheet 10
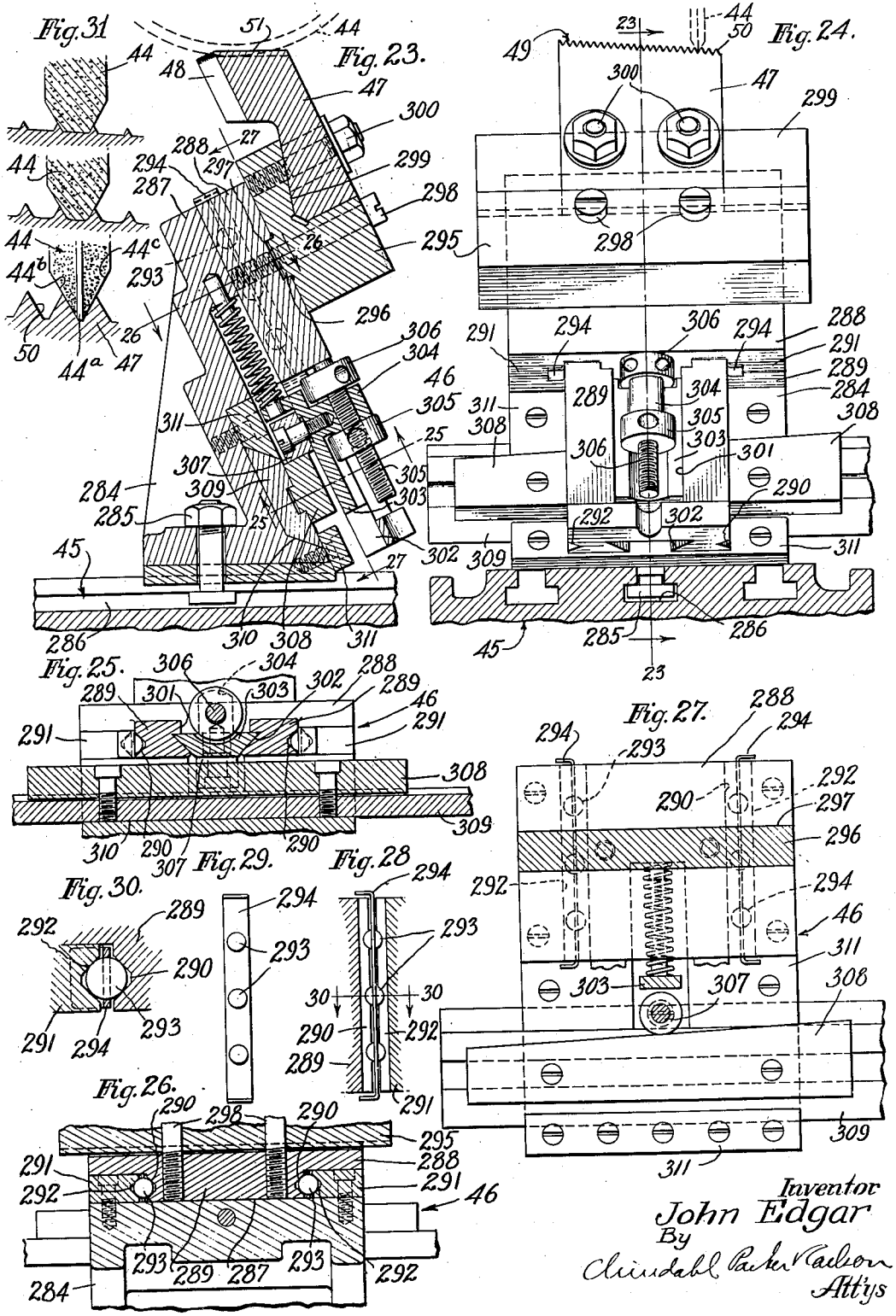

Patented Feb. 20, 1934

1,947,466

UNITED STATES PATENT OFFICE

1,947,466

THREAD TOOL GRINDING MACHINE

John Edgar, Rockford, Ill., assignor to Barber-Colman Company, Rockford, Ill., a corporation of Illinois Application November 4, 1927. Serial No. 230,966

27 Claims. (Cl. 51—92)

The present invention relates to improvements in grinding machines, and particularly machines for grinding milling tools, such as formed backing off tools. The grinding machine is particularly adapted for grinding tools for backing-off thread milling cutters of the ring type in which V-shaped teeth without lead are accurately spaced in concentric rows along a cylindrical or cone-shaped body.

The primary object of the present invention is to provide a novel machine of the above character which will grind and finish the desired contour on the tool, and in which the machine operations after the initial setting for the tool are automatic.

Further objects of the invention reside in the provision, singly and in various combinations, in a machine of the above character, of means for automatically indexing the tool blank relatively to the grinding wheel, and for indexing after each cut so as to distribute the effect of wear on the grinding wheel over a large surface on the tool blank, and to distribute the heat produced by the abrasion; and means for automatically feeding the tool blank relatively to the grinding wheel after each series of cuts across the blank.

Another object resides in the provision of dressing means mounted to limit the abrasive action of the grinding wheel to the desired depth and desired contour.

A further object resides in the provision of dressing means for automatically dressing the grinding wheel after each series of cuts across the tool blank, for accurately controlling the shape of the grinding wheel relatively to its position of feed, and for gradually changing the contour of the grinding wheel from a blunt contour to the desired contour as the operation proceeds to completion.

Still other objects are to provide a new and improved machine of the above character in which the tool is ground from a solid blank, and which is simple, relatively inexpensive, efficient, and accurate.

Further objects and advantages will become apparent as the description proceeds.

In the accompanying drawings, Figure 1 is a front view of a machine embodying the features of my invention.

Fig. 2 is a right end view of the machine.

Fig. 3 is a fragmentary sectional view taken along line 3—3 of Fig. 2.

Fig. 6 is a fragmentary longitudinal sectional view taken along line 6—6 of Fig. 4.

Fig. 7 is a partial sectional view on an enlarged scale taken along line 7—7 of Fig. 6.

Fig. 8 is a partial sectional view on an enlarged scale taken along line 5—5 of Fig. 6.

Fig. 9 is a fragmentary longitudinal sectional view taken along line 9—9 of Fig. 4.

Fig. 10 is a plan view of the clutch reversing mechanism.

Fig. 11 is a sectional view taken along line 11—11 of Fig. 12.

Fig. 12 is a right end view, partially in section, of the clutch reversing mechanism.

Fig. 13 is a left end view of the wheel dressing mechanism.

Fig. 14 is a right end view of the wheel dressing mechanism.

Fig. 15 is a fragmentary right end view of the wheel dressing mechanism with certain portions broken away and other portions in section.

Fig. 16 is a longitudinal sectional view of the wheel dressing mechanism taken along line 16—16 of Fig. 13.

Fig. 17 is a fragmentary view of one of the side dressing tool supports taken along line 17—17 of Fig. 14, but with the dressing tool slide shown in dotted outline.

Fig. 18 is a sectional view taken along line 18—18 of Fig. 17 with the dressing tool slide in place.

Fig. 19 is a sectional view taken along line 19—19 of Fig. 16.

Fig. 20 is a fragmentary right end view of the machine showing the feeding mechanism for the grinding wheel.

Fig. 21 is a transverse sectional view taken along line 21—21 of Fig. 20.

Fig. 22 is a vertical sectional view taken along line 22—22 of Fig. 21.

Fig. 23 is a sectional view of the tool blank holder taken along line 23—23 of Fig. 24.

Fig. 24 is a right end view of the tool blank holder.

Fig. 25 is a fragmentary sectional view taken along line 25—25 of Fig. 23.

Fig. 26 is a sectional view taken along line 26—26 of Fig. 23.

Fig. 27 is a fragmentary sectional view taken along the broken line 27—27 of Fig. 23.

Fig. 28 is a fragmentary sectional view of a detail of the tool blank holder.

Fig. 29 is a view in elevation of a part shown in Fig. 28.

Fig. 30 is a sectional view taken along line 30—30 of Fig. 28.

Fig. 31 is an enlarged diagramatical view in section, showing the grinding wheel in engagement with the tool blank at three different stages in the grinding operation.

Figure 1:
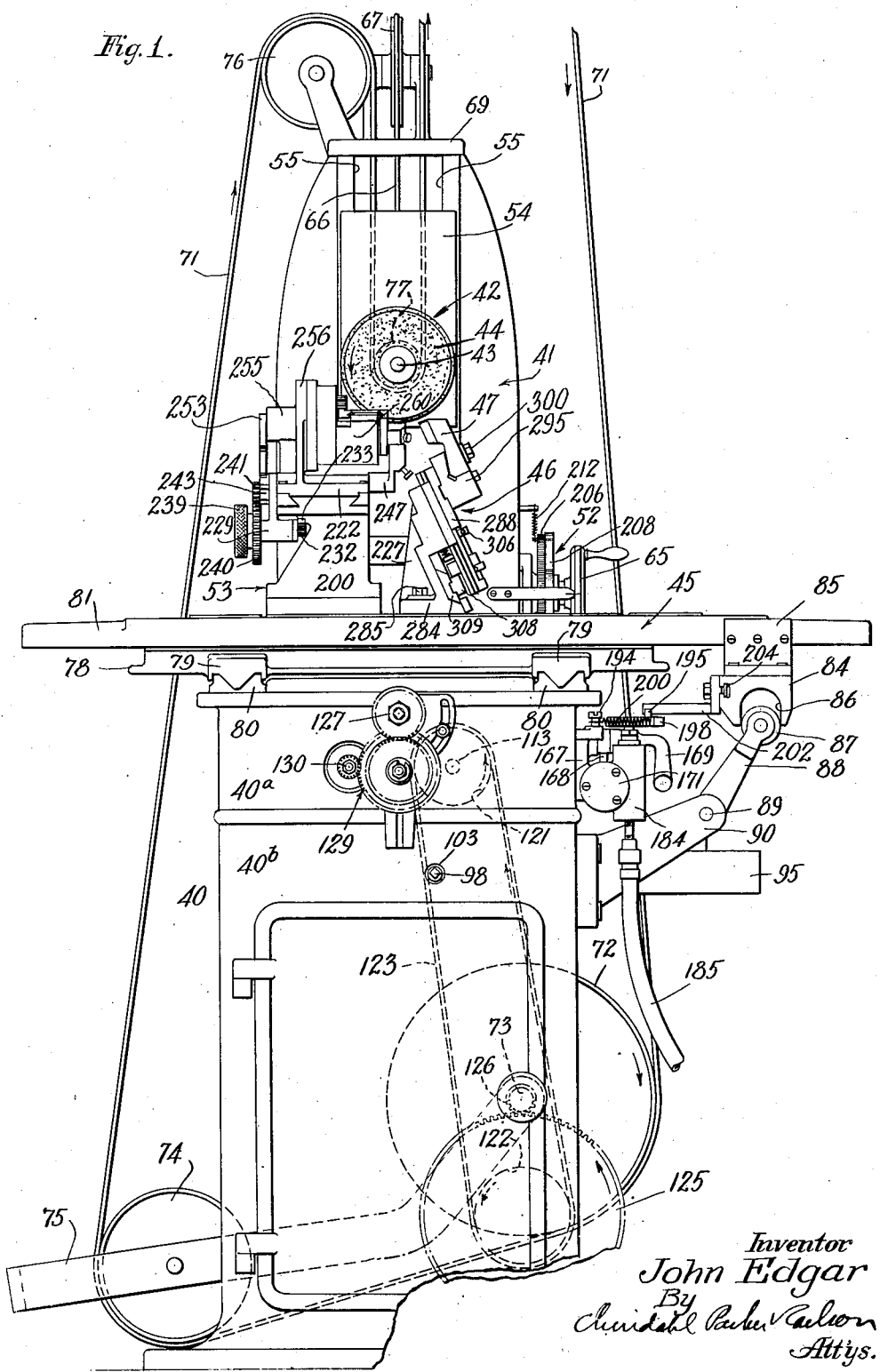

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

General description

Referring more particularly to the drawings, the grinding machine constituting the exemplary embodiment of the present invention comprises a base or frame 40 of suitable construction. A vertical column 41 is mounted on and rises from the rear wall of the base 40. While the machine shown is of the vertical type, it will be understood that the invention contemplates as well the provision of machines of other types, for example the horizontal type.

Mounted on the column 41 for vertical adjustment is a headstock 42 suitably supporting a spindle 43 for a grinding wheel 44 which preferably is disposed in a vertical plane longitudinally of the base 40. The grinding wheel 44 may be of any suitable form, and in the present instance, has the form of a disk with a formed periphery, comprising a peripheral face 44$^a$ and contiguous inclined side faces 44$^b$ and 44$^c$, adapted to grind V-shaped grooves.

Mounted on the base 40 for longitudinal traverse and lateral indexing is a work carriage 45 which supports a suitable work holder 46 adapted to present a work blank 47 to the grinding wheel 44. While work blanks of different kinds may be ground depending upon the specific purpose for which the machine is utilized, in the present instance I have shown the work blank 47 as a thread tool adapted to form and relieve the cutting contour of thread milling cutters of the ring type. Referring particularly to Figs. 23 and 24, the cutter 47 has an inclined cutting face 48 with a serrated cutting contour 49 inclined laterally of the face. The elements of the contour 49 are formed by V-shaped grooves 50 in the end of the cutter 47 and are relieved along lines 51.

The machine is provided with means for automatically reciprocating the carriage 45 to move the work blank 47 back and forth across the grinding wheel 44 so as to grind the notches 50; means for indexing the work blank 47 laterally to present consecutive notches 50 to the grinding wheel 44 in successive double stroke reciprocations of the carriage 45, and for returning the work blank in a free return feed at the end of the indexing movement to initial position for the next cut; a suitable feeding mechanism 52 for giving the grinding wheel 44 a downward feed of predetermined extent during the free return movement so as to position the grinding wheel to take a deeper cut during the succeeding indexing movement; and a suitable dressing mechanism 53 for dressing the grinding wheel 44 during the free return movement.

The headstock

The headstock 42 (see Figs. 1, 2, 21 and 22) comprises a slide 54 which is mounted between a pair of spaced parallel vertical guides 55 formed on the column 41. In the present instance, the column 41 is split, and the guides 55 are formed on the inner edges of the split portions. Secured non-rotatably to the lower end of the slide 54 is a feed screw 56 depending therefrom into threaded engagement with a nut 57. The latter is rotatable in a bearing 58 in a block 59 rigidly secured to the lower end of the column 41 between the guides 55. A worm wheel 60 is keyed on the nut 57, and meshes with a worm 61 on a shaft 62. Of the shaft 62, one end is supported in one side wall of the block 59, and the other end extends through a long bearing 63 which is suitably secured to one of the split portions of the column 41 and which extends therethrough. A collar 64 on the shaft 62 abuts against the inner end of the bearing 63, and a hand wheel 65 is secured to the outer end of the shaft, thereby locking the latter against endwise movement. It will be evident that the slide 54 can be adjusted manually by rotating the hand wheel 65. To prevent backlash, the upper end of the slide 54 is connected through a cord 66 leading over a sheave 67 to a counter weight 68. The sheave 67 is suitably supported on a bracket 69 bridging the upper ends of the split portions of the column 41.

The spindle 43 for the grinding wheel 44 is journaled in suitable bearings 70 in the slide 54, and is adapted to be driven continuously by suitable power means, such as a belt 71 connected to an outside source of power (not shown). In the present instance, the belt 71 is adapted to be driven in the direction of the arrows in Fig. 1 over a large pulley 72 mounted on a main drive shaft 73 in the base 40, then over an idler pulley 74 mounted in a frame 75 pivoted on the base, then over a pulley 76 suitably journaled on the bracket 69, and then over a pulley 77 on the spindle 43.

The work carriage

The work carriage 45 (see Figs. 1 and 2) comprises a cross feed slide 78 having parallel guides 79 engaging transverse guideways 80 on an upper section 40$^a$ of the base 40, and a main longitudinal traverse slide or table 81 having guides 82 engaging ways 83 on the slide 78 for horizontal reciprocation in the plane of the grinding wheel 44.

Figure 5:
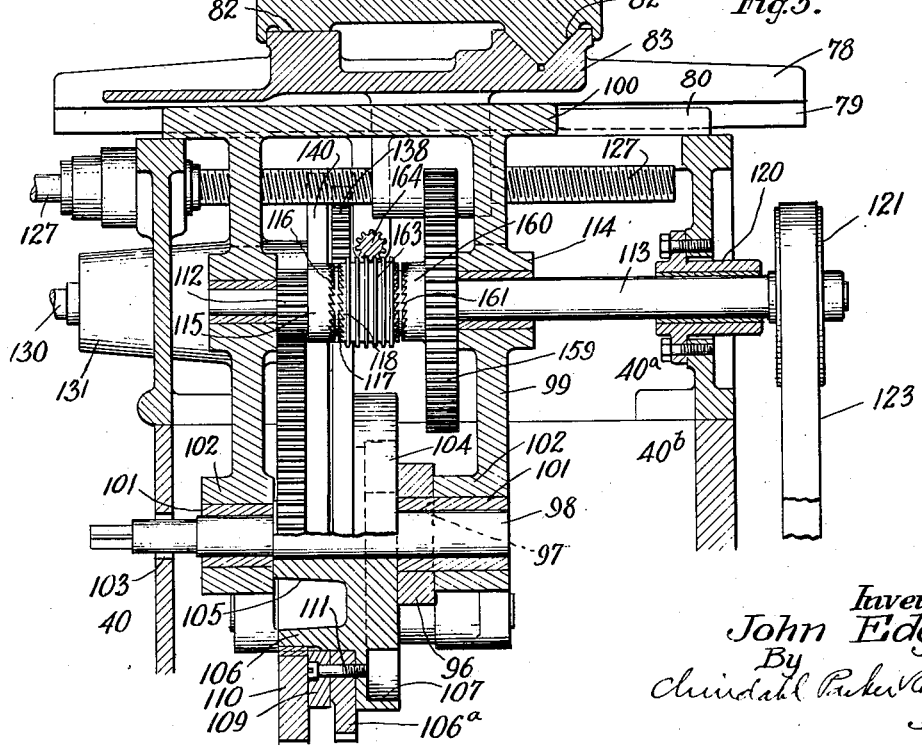
Fig. 5 is a fragmentary transverse sectional view taken along line 5—5 of Fig. 6.

Means is provided for actuating the slide or table 81 on the slide 78 to reciprocate the work blank 47 back and forth across the grinding wheel 44 during the step-by-step indexing movement, to position the blank out of engagement with the wheel 44 during each step of said movement and during the free return indexing movement, and to position the dressing mechanism 53 and the wheel 44 for the dressing operation during the free return movement. This means (see Figs. 1, 2 and 9) in the present instance comprises a block 84 extending transversely underneath the right end of the table 81, and secured thereto in spaced relation by suitable retaining end straps 85. The space between the table 81 and the block 84 is sufficient to permit the latter to pass underneath the adjacent projecting side of the slide 78. Formed in the underside of the block 84 is a longitudinal groove 86, the trough of which is rounded, and in which a roller 87 is operatively disposed at all times regardless of the position of the slide 78 or the table 81. The roller 87 is carried by one end of a lever 88 which is pivotally mounted intermediate its ends on a pin 89 in an extension bracket 90 rigidly secured to the right end wall of a lower section 40ᵇ of the base 40. The other end of the lever 88 is provided with a gear segment 91 (see Fig. 9) which meshes with a gear rack 92 formed on the outer end of a slide rod 93. The latter is slidably disposed in spaced bearing sleeves 94 located in opposite ends of a supporting sleeve 95 formed integral with the bracket 90. The inner end of the rod 93 is formed integral with a yoke or fork 96 which slidably embraces a rectangular bearing block 97 relatively rotatable on a countershaft 98 journaled in a bracket 99 in the base 40. The bracket 99 is suspended from a plate 100 resting on flanges formed integral with the base section 40ᵃ along the inner edges of the guideways 80, and is also secured to the lower section 40ᵇ of the base. In the present instance, the shaft 98 (see Fig. 5) is supported in bearing sleeves 101 in spaced bearings 102 formed in the bracket 99, and one end thereof projects through an opening 103 in the front wall of the base 40, and is squared for the attachment of a handle (not shown). The rear sleeve 101 is formed integral with the block 97. It will be evident that by this construction, the rod 93 is firmly supported.

Keyed or fixed on the shaft 98 is a rotary cam member 104 of suitable construction for actuating the rod 93 in a predetermined sequence. In the present instance, the cam member 104 has a hub 105 disposed snugly between the sleeves 101, an annular flange 106 on its front side concentric with the hub, and a cam groove 107 in its rear side engaging a cam roller 108 on the yoke 96. The cam groove 107 (see Fig. 9) has a portion 107ᵃ with an increasing throw from moving the table 81 to the left with a variable speed, a portion 107ᵇ with a decreasing throw symmetrical with the portion 107ᵃ for moving the table 81 to the right and a dwell portion 107ᶜ extending through approximately 180° for holding the table 81 stationary in its extreme right end position for a predetermined period once for each revolution of the cam member 104.

Positioned in superimposed relation and in the order named on the flange 106 are a ring gear 106ᵃ, a spacer ring 109, and a ring gear 110. The gear 106ᵃ and the ring 109 are rigidly held in assembled relation with the cam 107 by suitable means, such as screw bolts 111. The gear 110 is keyed to the end of the flange 106, and meshes with a pinion 112 (see Fig. 8) rotatable on a countershaft 113 which is journaled in bearings 114 in the bracket 99. Rigid with the pinion 112 is a clutch element 115 having suitable end clutch teeth 116 adapted to engage similar but opposed teeth 117 on a clutch sleeve 118. The latter is splined for longitudinal movement on a sleeve 119 rigid with the shaft 113. The means for actuating the clutch sleeve 118 to connect or to disconnect the pinion 112 and the shaft 113 will be described hereinafter.

The shaft 113 extends rearwardly out of the frame 40 through a bearing 120. Mounted on the outer end of the shaft 113 is a pulley 121 which is adapted to be driven from a pulley 122 through a belt 123 (see Figs. 1, 2 and 5). The pulley 122 is mounted on a shaft 124 journaled in the lower section 40ᵇ of the base 40. A large gear 125 is keyed to the shaft 124, and meshes with a pinion 126 on the shaft 73. It will be evident that when the clutch sleeve 118 is in engagement with the clutch element 115, the cam 107 will be driven in a counter-clockwise direction as viewed in Figure 9, to reciprocate the table 81 with a dwell in the right end position after each complete reciprocation.

*The indexing mechanism*

Means is provided for indexing the slide 78 rearwardly step by step to present the notches 50 of the tool blank 47 successively to the grinding wheel 44 in successive double reciprocations of the table 81, and to return the slide 78 in a free return indexing movement to its initial forward position at the completion of each cut along the width of the contour 49. It will be understood that the invention is not limited to indexing after a double stroke reciprocation, but contemplates that the step by step indexing may be made to occur after any desired number of single reciprocations, for example after each single stroke reciprocation.

Figure 4:
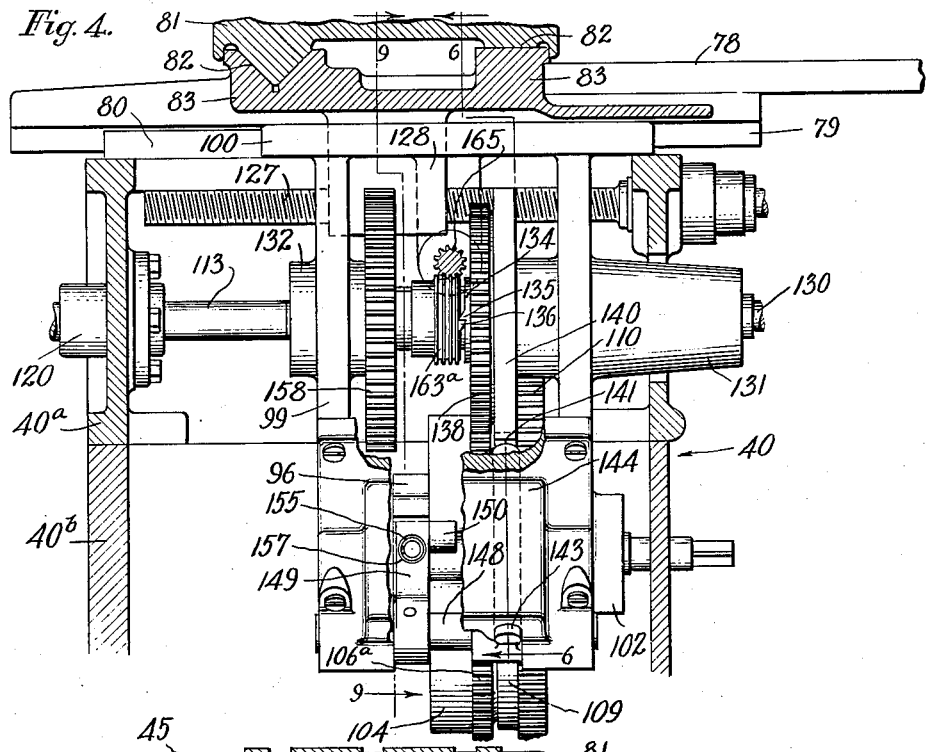
Fig. 4 is a fragmentary transverse sectional view taken along the line 4—4 of Fig. 6.

The indexing mechanism in its preferred form (see Figs. 5, 6 and 9) comprises a suitable feed screw 127 anchored in the front wall of the base 40, and extending rearwardly into threaded engagement with a nut 128 depending from the slide 78. The front end of the feed screw 127 is connected through speed-change gearing 129 at the front of the base 40 to a shaft 130 journaled in bearings 131 and 132 in the bracket 99 and is squared for reception of a handle (not shown). Keyed to the shaft 130 is a sleeve 133 (see Fig. 7) on the front end of which a clutch element 134 is rotatably mounted. The clutch element 134 has a clutch tooth 135 on its rear face (see Fig. 4) adapted to coact with an opposed clutch tooth 136 on a clutch sleeve 137 splined to the sleeve 133. The clutch sleeve 137 is adapted to be actuated simultaneously with and in the same direction as the clutch sleeve 118 by means to be described hereinafter so that the clutch teeth 116 and 117 and the clutch teeth 135 and 136 will be in and out of engagement at the same time. Keyed to the clutch element 134 is a gear 138 having an annular flange 139 on its front face. The gear 138 is adapted to mesh periodically with the gear 106ᵃ. The periphery of the gear 106ᵃ is toothed through slightly less than 180° (see Fig. 6), and the gear is so arranged relatively to the cam 104 that the toothed portion will engage the gear 138 shortly after the roller 108 enters the cam dwell 107ᶜ, and that it will move out of engagement with the gear 138 shortly before the roller leaves the cam dwell. Each rotation of the gear 138 is transmitted to the feed screw 127 to index the work blank 47 rearwardly a distance corresponding to the pitch of the notches 50. The extent of this movement can be adjusted by adjusting the gearing 129.

To positively lock the gear 138 against movement when out of mesh with the gear 106ᵃ, it is provided with a gear ratio to the gear 106ᵃ such that it will make one complete revolution during each indexing movement. An annular lock plate 140 is secured on the flange 139 to the gear 138, and is formed in its periphery with a notch 141. A lock tooth 142 (see Figs. 6 and 9) formed on one end of a pin 143 is adapted to engage the notch 141 after each revolution of the gear 138. The pin 143 is slidably mounted in a suitable guide sleeve 144 which is formed on a bracket 145 suitably secured to the bracket 99. Formed on one end of the pin 143 is a longitudinal gear rack 146 which meshes with a gear segment 147 secured to a shaft 148 journaled in the bracket 145. A cam lever 149 is also secured to the shaft 148, and carries a cam roller 150 engaging the outer peripheral face of the cam 104. The cam face is formed with two arcuate surfaces 151 and 152 of different radii, which extend through slightly less than 180° each, and which are connected by inclined rise and fall surfaces 153 and 154 respectively. The surface 153 is so related to the cam 104 and the gear 106a that it will engage the roller 150 shortly after the roller 108 enters the cam dwell 107c and shortly before the gear 106a meshes with the gear 138; and the surface 154 is so related to the same elements that it will engage the roller 150 shortly after the gear 106a moves out of mesh with the gear 138. A coiled spring 155 rests at opposite ends in depressions 156 and 157 respectively in the bracket 145 and the lever 149, and serves to hold the roller 150 yieldingly against the cam 104. It will be evident that each time the table 81 moves into its dwell position, the tooth 142 is retracted from the index plate 140, the gear 138 then is given a complete revolution to index the work blank 47 the width of one notch 50, and the tooth 142 then is returned into engagement with the plate 140.

Keyed to the sleeve 133 on the shaft 130 is a gear 158 (see Fig. 7) which meshes with a gear 159 (see Fig. 8) rotatable on the shaft 113. The gear 159 is formed on one face with a clutch element 160 having teeth 161 adapted to engage similar but opposed teeth 162 on the clutch sleeve 118. It will be evident that when the clutch sleeves 118 and 137 are moved rearwardly the clutch teeth 116 and 117 and the clutch teeth 135 and 136 will be disengaged, and the clutch teeth 161 and 162 will be engaged, thereby disconnecting the reciprocating cam drive for the slide 81 and the step by step indexing gear 138 and connecting the gears 158 and 159 respectively to the shafts 130 and 113 to drive the feed screw 127 in a direction such that the carriage 45 will be fed forwardly in the free return indexing movement to initial position.

*The reversing mechanism*

Means is provided for automatically shifting the clutch sleeves 118 and 137 at the end of the step by step indexing movement to disconnect the drive for the cam 104 so as to discontinue the traverse of the table 81 and the step by step movement of the slide 78, and to connect the drive for the free return feed; and again at the end of the free return indexing feed to reinstitute the initial connections. This means is so related to the cam 104 that when the clutches are reversed, the slide 81 is in its dwell position at the right end of the base.

The clutch sleeves 118 and 137 are formed peripherally with annular ribs constituting longitudinal rack gears 163 and 163a in mesh respectively and for any position of rotation of the sleeves with gears 164 and 165. These gears are formed on a reversing shaft 166 (see Fig. 9) which is suitably journaled in the bracket 99 and a bracket 167 mounted on the right end wall of the base 40. Secured to the outer end of the shaft 166 are a depending gear segment 168 and a handle 169 for manually adjusting the shaft. The gear segment 168 extends through a longitudinal milled slot 170 in one side of a cylinder 171 into mesh with a longitudinal rack gear 172 which is formed along a double end piston 173 (see Figs. 10, 11 and 12). Suitable heads 174 and 175 are removably secured to the ends of the cylinder 171, and with the piston 173 define opposite end pressure fluid chambers 171a and 171b.

Pressure fluid, such as compressed air, is adapted to be directed selectively to the opposite end chambers 171a and 171b through suitable passages 176 and 177 respectively. Preferably, the passages 176 and 177 are formed in the wall of the cylinder 171, and open to the interior thereof through suitable ports 178 and 179 respectively. The passages 176 and 177 also open respectively through ports 180 and 181 to a valve chamber 182 where they are adapted to be connected by a suitable valve 183 alternately and successively to a suitable source of pressure fluid and the exhaust. Preferably, the valve chamber 182 is a tapered bore formed in a tubular enlargement 184 on one side wall of the cylinder 171. The lower end of the chamber 182 is connected through a suitable conduit 185 to a source of compressed air (not shown). The valve 183 comprises a tapered member rotatably seated in the valve chamber 182, and having an axial bore 186 in its lower end communicating with the conduit 185. The upper end of the bore 186 communicates with two peripherally spaced ports 187 and 188 adapted to be moved respectively into and out of communication with the ports 180 and 181 in alternate sequence. Formed in the outer peripheral surface of the valve member 183 is a groove 189 the ends of which terminate near the ports 187 and 188 and which are adapted to be moved selectively with the latter into and out of communication with the ports 180 and 181. The groove 189 is connected through a passage 190 to an axial bore 191 in the upper end of the valve member opening to the atmosphere. The ports are so arranged that when the valve member 183 is in either of its two extreme positions, one end chamber of the cylinder 171 will be connected to the source of compressed air and the other end chamber will still be open to the exhaust.

Rigidly secured to the upper end of the valve member 183 is a lever 192. A coiled spring 193 connects one end of the lever 192 to a stud 194 on the bracket 167, and tends to oscillate the valve member in a direction to bring the port 188 into communication with the port 181 which would move the piston 173 rearwardly. The other end of the lever 192 is provided with a pin 195 and with two spaced teeth or shoulders 196 and 196a adapted selectively to engage an opposed tooth or shoulder 197 on the forward arm of a bell crank lever 198 pivoted on the bracket 167 at 199. When the shoulders 196 and 197 are in engagement, the ports 181 and 188 are in registration; when the shoulders 196a and 197 are in engagement, the ports 180 and 187 are in registration. A coiled spring 200 connecting the curved end of the forward arm of the lever 198 to the stud 194 tends to hold the lever arm against the lever 192 so that the shoulder 197 will snap into selective engagement with the shoulders 196 and 196a when the lever 192 is oscillated in opposite directions. The rear arm of the bell crank lever 198 carries a pin 201. The pins 195 and 201 are disposed respectively in the path of movement of two reversing fingers 202 and 203 movable with the slide 78. Preferably, these fingers 202 and 203 are adjustably mounted in spaced relation on the block 84 by clamp bolts 204 having heads in engagement with a T-slot 205 in the inner side of said block. The finger 203 is adapted to engage the pin 201 at the ends of the step by step indexing movement to disengage the shoulders 196ª and 197, thereby causing the valve member 183 to oscillate the shoulder 196 into engagement with the shoulder 197 so as to bring the port 188 into communication with the port 181. Thereupon the piston 173 will be moved rearwardly to reverse the clutches so as to return the carriage 45 to initial position while the table 81 is in its right end position. The finger 202 is adapted to engage the pin 195 as the carriage 45 nears its initial position so as to oscillate the shoulder 196ª into engagement with the shoulder 197, thereby bringing the port 187 into communication with the port 180. Thereupon the piston 173 will be moved forwardly so as to institute the following step by step indexing movement. It will be understood that the pin 201 and the finger 203 are so related with reference to the cam 104 that they will engage at a time when the table 81 is in its dwell position at the right end of its reciprocation so that the work holder 46 is out of operative relation and the dressing mechanism 53 is in operative relation to the grinding wheel 44 during the free return indexing.

The feeding mechanism

Means is provided for giving the grinding wheel 44 a predetermined downward feed after each step by step indexing movement, i. e., after the grooves 49 have been ground lightly from front to rear across the end of the tool 47. This means (see Figs. 1, 2, 20 and 21) comprises a ratchet wheel 206 keyed to the shaft 62 between the bearing 63 and the hand wheel 65. The ratchet wheel 206 is formed with a hub 207 on which a lever 208 is rotatably mounted. One end of the lever 208 carries a pivotal pawl 209 which is adapted to engage the teeth of the ratchet wheel 206. The pawl 209 is formed with heel 210 adapted to engage one side or the other of a spring detent 211 secured to the end of the lever 208. When the heel 210 is positioned to one side of the detent 211, the pawl will be held yieldingly into engagement with the ratchet wheel; and when it is positioned to the other side of the detent, the pawl will be held out of engagement with the wheel. A coil spring 212 connects the lever 208 to the column 41, and tends to move the pawl 209 counter-clockwise over the teeth of the ratchet wheel 206.

Means is provided for oscillating the lever 208 in a clockwise direction so as to periodically move the pawl 209 against the ratchet teeth. This means preferably, comprises an elongated bracket arm 213 which is secured to the slide 78 and which extends rearwardly therefrom alongside the column 41 and underneath the hand wheel 65. The arm 213 is formed in its upper surface with a longitudinal T-slot 214 along which a cam arm 215 is adjustably secured by suitable means such as a bolt 216. The cam arm 215 has a downwardly inclined surface 217 on its forward end and a horizontal surface 218 on its rear end, and underlies a pin 219 projecting laterally from the forward end of the lever 208. The cam arm 215 and the pin 219 are so related that as the slide 78 moves into its rearward position the pin will move downwardly along the surface 217 thereby causing the pawl 209 to move over the ratchet teeth, and when the slide 78 returns to its forward position in the free return indexing movement, the surface 217 will raise the pin 219 against the force of the spring 212 thereby causing the pawl 209 to rotate the ratchet wheel 206 so as to effect a downward feed of the grinding wheel 44.

The dressing mechanism

The dressing mechanism (see Figs. 1, 2 and 13 to 19) comprises a suitable base 220 mounted on the table 81 for longitudinal and lateral movement therewith. The upper surface of the base 220 is formed with dove-tailed guides 221 on which a slide 222 is secured by suitable gib plates 223. The slide 222 is rigidly secured against movement with the slide 78 laterally of the base 40 by means of a rearwardly projecting arm 224 (see Fig. 3) having a depending finger 225 slidably engaging in a spline groove 226 in the upper surface of a block 227 secured across the front of the column 41. By this construction, the dressing mechanism is retained in the plane of the grinding wheel for movement into and out of operative position regardless of the lateral position of the carriage 45.

Secured to the left end of the slide 222 is a depending V-shaped bracket 228 having a bearing 229 at its apex in which a stub shaft 230 is rotatably mounted. The inner end of the shaft 230 has a collar 231 secured thereto and abutting against the end of the bearing 229, and is formed with a spur gear 232 which meshes with a rack gear 233 suitably secured to the underside of the base 220 and extending transversely thereof. The outer end of the shaft 230 is formed with an enlargement 234 (see Fig. 19) having a plurality of peripherally spaced and inclined notches or cam faces 235. A suitable clutch sleeve 236 is rotatably mounted on the shaft 230 between the adjacent end of the bearing 229 and the enlargement 234, and has an annular flange 237 disposed about the periphery of said enlargement.

A plurality of balls 238, one in each instance, are freely disposed in the notches 235 and are retained therein by means of an end cap 239 fitting over the open end of the flange 237. It will be noted that when the shaft 230 is rotated in a clockwise direction as viewed in Fig. 19, as it is when the base 220 is moved forwardly from the column 41, the balls 238 will move into wedging engagement with the notches 235 and the flange 237 so as to effect a clutch connection between the shaft 230 and the sleeve 236; and that when the shaft 230 is rotated in a counter-clockwise direction, as it is when the base 220 is moved rearwardly toward the column 41, it will rotate freely without rotating the sleeve 236.

Keyed on the sleeve 236 is a spur gear 240 which meshes with a pinion 241 (see Fig. 13) keyed to a stub shaft 242 journaled in the bracket 228. The pinion 241 is formed integral on one end with an eccentric 243 which is rotatably disposed in a bifurcated end 244 of a bell-crank lever 245 keyed to the outer end of a shaft 246 journaled in the slide 222. The shaft 246 extends through the slide 222, and has an arm 247 secured to its right end. A suitable dressing tool 248 is adjustably secured in a socket 249 in the free end of the arm 247. In the present instance, the dressing tool 248 has a diamond point 250, and is adapted to be adjusted by means of a screw 251 threaded into the inner end of the socket 249. The diamond point 250 is arranged for oscillation in a vertical plane across the peripheral face 44ª of the grinding wheel 44 to dress the latter.

One arm of the lever 245 is formed with a gear segment 252 which meshes with a gear segment 253 rigidly secured to one end of a shaft 254. The latter is suitably journaled in a bearing 255 formed in an upstanding bracket 256 at the left edge of the slide 222. A spur gear 257 is keyed to the right end of the shaft 254, and meshes at opposite sides with two rack gears 258 and 259 provided on suitable dressing tool slides 260 and 261 respectively. Preferably, the gear racks 258 and 259 are formed integral with the slides 260 and 261, and extend longitudinally along the left edges thereof.

The slides 260 and 261 carry suitable dressing tools 262 and 263 having diamond points 264 and 265 adapted respectively to dress the cutting faces 44b and 44c of the grinding wheel 44. Preferably, the dressing tools 262 and 263 are mounted in suitable sockets 266 formed in laterally projecting lugs 267 and 268 on the right sides of the slides 260 and 261, and can be adjusted therein by means of suitable adjusting screws 269 and 270.

The slides 260 and 261 are mounted for reciprocation on suitable brackets 271 and 272 adjustably secured to the bracket 256. In the present instance, each bracket 271—272 is provided with a composite guide strip 273 having V-shaped guideways 274 in opposite longitudinal edges. Each slide 260—261 is longitudinally recessed in its rear face to form spaced flanges 275 having V-shaped guideways 276 directly opposed to the guideways 274. A plurality of balls 277 are disposed between the guideways 274 and 276. Preferably, the balls 277 are held in spaced relation in suitable retaining strips 278 which extend between the guideways 274 and 276, and the ends of which are bent over the ends of the slides 260—261. The brackets 271 and 272 are provided with arcuate arms 279 and 280 respectively, which are adjustably clamped to a plate 281 on the bracket 256 by means of bolts 282. To this end, each of the arms 279—280 is formed with a T-slot 283 engaging one of the bolts 282.

It will be evident that as the base 220 is moved forwardly, the eccentric 243 will be rotated in a counter-clockwise direction as viewed in Fig. 13. This will oscillate the shafts 246—254 to reciprocate the dressing points 250—264—265 respectively across the faces 44a—44b—44c. The relative movement of the dressing points is so timed that there is no interference. By adjusting the brackets 271 and 272 to the proper angle, the desired contour will be provided on the grinding wheel. As the grinding wheel 44 is fed downwardly its contour will gradually approach the final predetermined contour, the dressing points 250—264—265 serving to limit the depth and shape of the cut.

The dressing mechanism per se is covered in my divisional application Serial No. 245,341, filed January 9, 1928 (Patent No. 1,892,388).

*The work holder*

Any suitable work holder 46 may be provided. Frequently, as in the present instance, the work blank 47 to be ground has an inclined contour 49 adapted to mill conical parts. To avoid tilting the work blank 47, the work holder 46 is provided in which the work blank is moved vertically in timed relation to the indexing movement so as to compensate for the inclination of the contour.

The work holder 46 (see Figs. 23 to 30) comprises a suitable base 284 which is adjustable along the table 81, and which is adapted to be clamped in position by suitable means, such as a bolt 285 engaging a T-slot 286 formed longitudinally in the table. The base 284 is formed with an upwardly inclined surface 287 on which the upper end of a tool slide 288 is slidably mounted.

To guide the slide 288, it is formed in its underside with a reduced portion 289 having longitudinal V-shaped grooves 290 in opposite sides. Two parallel guide strips 291 are secured along opposite side edges of the surface 287, and have longitudinal V-shaped grooves 292 in their inner sides directly opposed to the grooves 290. Disposed in spaced relation between the grooves 290 and 292 are a plurality of ball bearings 293. Preferably these bearings 293 are held in spaced relation between the grooves 290 and 292 by retainer strips 294 the ends of which are bent to embrace the upper and lower ends of the strips 291. Mounted on the slide 288, is a suitable work seat 295 which is accurately positioned by a tongue 296 on its underside fitting into a transverse groove 297 in the slide, and which is clamped in place by means of screw bolts 298. The work seat 295 is formed with a suitable notch or seat 299 in which the work blank 47 is secured by means of screw bolts 300.

The lower end of the slide 288 is reduced in width to that of the part 289, is formed with a central longitudinal slot 301, and has a dovetailed guideway 302 formed in the sides of said slot. Slidably disposed in the guideway 302 is an adjusting slide 303 having a lug 304 projecting outwardly through the slot 301. An adjusting screw 305 is anchored in the slide 288, and projects through the lug 304. Suitable lock nuts 306 on the screw 305 are adapted to be turned into clamping engagement with the sides of the lug 304 to hold the screw in adjusted position. The slide 303 has a roller 307 on its underside which rests on the upper edge of a guide bar 308. The upper edge of the guide bar 308 may have any desired contour, and in the present instance is straight and inclined upwardly and rearwardly so as to compensate for the inclination of the contour 49 of the work blank 47 during the indexing movement. The guide bar 308 is rigidly secured to a slide 309 which is disposed in a lateral guideway 310 in the base 284 and which is held therein by suitable gib plates 311. The slide 309 is held against movement with the base 284 laterally of the base 40 by means of a finger 312 (see Fig. 3) projecting upwardly into a spline engagement with a longitudinal slot 313 in the underside of the block 227. It will be evident that the vertical position of the work blank 47 will vary in accordance with the lateral position of the work holder 46 regardless of what position longitudinally of the base 40 the latter occupies.

The work holder per se is covered in my divisional application Serial No. 245,342, filed January 9, 1928, (Patent No. 1,869,413).

*Brief résumé of the operation*

At the start of the operation the slide 78 is in its forward position so as to locate the work blank 47 ahead of the grinding wheel 44, and the table 81 is in its dwell position. The feed is adjusted to produce a light cut.

In the operation, the carriage 45 is reciprocated longitudinally of the base 40. At the end of each double reciprocation, the table 81 is moved into a dwell position, and during this dwell period, the slide 78 is indexed rearwardly a distance corresponding to the lead of the threads to be ground on the work blank 47. During this step by step indexing movement the work blank 47 is gradually lowered to compensate for the inclination of the contour 49. After a light cut has been taken on all of the notches 50, the pin 219 runs down the cam surface 217 of the feeding mechanism, and then the finger 203 trips the clutch reversing mechanism, the table 81 at this instant being in its dwell position so as to clear the work blank 47 and the grinding wheel 44, and to bring the dressing mechanism 53 and the grinding wheel into operative relation.

The slide 78 is now returned in a single continuous indexing movement to its initial position. At the commencement of this movement, the pin 219 rides up the surface 217 onto the surface 218 thereby giving the grinding wheel 44 a predetermined downward feed. During the return movement, dressing points 250—264—265 are reciprocated across the respective elements of the contour of the grinding wheel 44.

At the end of the free return movement, the finger 202 trips the clutch reversing mechanism, thereby reinstating the initial machine movements and discontinuing the operation of the dressing mechanism. Thereupon the foregoing cycle of operations is repeated.

The tool is ground from a solid blank. During the first part of the operation, the periphery of the grinding wheel 44 is blunt as shown in the first view of Fig. 31. At this stage, the dressing point 250 does not contact with the grinding wheel, and the dressing points 264 and 265 merely define the correct angle of the side faces 44$^b$ and 44$^c$ and the width of the notches 50. As the grinding proceeds and the grinding wheel 44 is fed into the work blank 47, the side faces of the wheel are gradually dressed down to the ultimately desired contour. Thus theoretically only the periphery of the grinding wheel 44 does any cutting. The dressing points serve to limit the extent of the grinding cut.

It will be evident that I have provided a simple and relatively inexpensive machine for grinding formed backing-off tools which is automatically operated, and which is accurate and efficient. During the grinding operation, the effect of wear on the grinding wheel and heat resulting from the abrasion are distributed over the entire face of the work blank.

I claim as my invention:

1. A grinding machine having, in combination, a grinding wheel, a support for a piece of work, means for automatically effecting a relative reciprocation between said wheel and the work, means for automatically effecting a linear step-by-step indexing movement between said wheel and the work, and means for automatically effecting a relative approaching feed between said wheel and the work after said step-by-step indexing movement across the work.

2. A grinding machine having, in combination, a grinding wheel, a support for a piece of work, means for automatically effecting a relative reciprocation between said wheel and the work, means for automatically effecting a step-by-step indexing movement between said wheel and the work, means for automatically effecting a relative approaching feed between said wheel and the work after said step-by-step indexing movement, and means for automatically dressing said grinding wheel after said feeding movement.

3. A grinding machine having, in combination, a grinding wheel, a support for a piece of work, means for effecting a relative reciprocation between said wheel and the work, means for effecting a relative step-by-step indexing movement in one direction between said wheel and the work during said reciprocatory movement, means for effecting an automatic return indexing movement after the completion of said step-by-step indexing movement, means for effecting an automatic relative approaching feed between said wheel and the work during said return indexing movement, and means for automatically dressing said wheel during said return indexing movement and after said approaching feed.

4. A grinding machine having, in combination, a grinding wheel, a support for a piece of work, means for automatically effecting a relative reciprocation between the wheel and the work, means for automatically effecting an indexing movement between said wheel and the work across the work in timed relation to the reciprocation, and means for automatically effecting a relative approaching feed between said wheel and the work at the end of a series of indexing movements in one direction.

5. A grinding machine having, in combination, a grinding wheel, a support for a piece of work, means for automatically effecting a relative reciprocation between said wheel and the work, means for automatically effecting an indexing movement in opposite directions between said wheel and the work, means for automatically effecting a relative approaching feed between said wheel and the work after said indexing movement in one direction, and means for automatically dressing said grinding wheel after said last mentioned indexing movement.

6. A grinding machine having, in combination, a grinding wheel, a support for a piece of work, means for automatically effecting a relative reciprocation between said wheel and the work, means for automatically effecting a relative step-by-step indexing movement in one direction between said wheel and the work during said reciprocatory movement, means for automatically effecting a return indexing movement after the completion of said step-by-step indexing movement, means for automatically effecting a relative approaching feed between said wheel and the work during said return indexing movement, and means for automatically dressing said wheel during said return indexing movement.

7. A grinding machine having in combination, a grinding wheel, a support for a piece of work, means for effecting a relative reciprocation between said wheel and the work, means for effecting a relative step-by-step indexing movement between said wheel and the work in one direction at right angles to said reciprocatory movement in timed relation thereto, for automatically effecting a continuous return indexing movement in the opposite direction at the end of said first mentioned indexing movement, and for rendering said first mentioned means inoperative during said return indexing movement.

8. A grinding machine having, in combination, a grinding wheel, a support for a piece of work, means for effecting a relative reciprocatory movement between said wheel and the work, said means providing a dwell at one end of said reciprocatory movement with the work out of engagement with said wheel, means for effecting a relative indexing movement between said wheel and the work at right angles to said reciprocatory movement and in opposite directions, said indexing movement in one direction being periodic, and occuring during dwell periods in said reciprocatory movement, and means for reversing the direction of said indexing movement during a dwell period in said reciprocatory movement, and for rendering said first mentioned means inoperable and operable respectively at the beginning and the end of said return indexing movement.

9. A grinding machine having in combination, a grinding wheel, a support for a work blank, means for effecting a relative reciprocatory movement and a relative indexing movement in one direction at right angles thereto between said wheel and said blank, means for effecting a relative free return indexing movement in the opposite direction between said wheel and the work, and trip means automatically operable at the ends of said indexing movements to render said two first mentioned means alternately operable and inoperable.

10. A grinding machine having in combination, a grinding wheel, a support for a work blank, cam means for reciprocating said support relative to said wheel to grind the blank, said cam means periodically providing a dwell at one end of the reciprocatory movement with said wheel out of engagement with the blank, indexing means operable during each dwell period to index said support in one direction laterally of said wheel, free return means for moving said support in the other direction laterally of said wheel, and means automatically effective during a dwell period after indexing said support past said wheel to render said cam means and said indexing means inoperable and said free return means operable and effective after the return movement to render said cam means and said indexing means operable and said return means inoperable.

11. In a machine of the class described, in combination, a clutch, a piston and cylinder unit, means operatively connecting said unit to said clutch to actuate the latter upon movement of said piston in said cylinder, a source of fluid pressure, a valve for directing fluid pressure selectively to opposite ends of said unit, spring means tending to move said valve in one direction, a trip lever adapted to hold said valve in either of two positions, means for tripping said lever to permit movement of said valve into one of said positions, and means for moving said valve into the other of said positions.

12. In a machine of the class described, in combination, a movable element, a piston and cylinder unit operatively connected to said element for actuating the latter, a valve for directing fluid pressure selectively to opposite ends of said unit, spring means tending to move said valve in one direction, a trip member adapted to hold said valve in either of two positions, means for tripping said member to permit movement of said valve into one of said positions, and means for moving said valve into the other of said positions.

13. In a machine of the class described, in combination, a base, a drive shaft, a feed slide, a traverse slide, one slide mounted on the other and both mounted on the base, a cam having a dwell portion, means operable by said cam for reciprocating said traverse slide with a pause at one end of the reciprocation, a feed screw, means operable in timed relation to said cam and during said pauses to adjust said screw a predetermined extent, a clutch for connecting said last mentioned means to said screw, a clutch for connecting said shaft to said cam and said last mentioned means, a clutch for connecting said shaft to said screw, and means operable periodically to alternately open and close said first two mentioned clutches and said last mentioned clutch.

14. A grinding machine, having in combination, a base, a grinding wheel, an index slide mounted on said base for reversible movement laterally of said wheel, a traverse slide mounted on said index slide for reciprocation in the plane of said wheel, a support for a work blank on said traverse slide, means for actuating said traverse slide, means for indexing said index slide to move said work blank laterally across said wheel, a reversing mechanism for said last mentioned means, a feeding mechanism operable by said index slide to effect an approaching feed between the work blank and said wheel at the end of the indexing movement in one direction, and a dressing mechanism mounted on said traverse slide for reciprocation therewith but held against movement with said index slide for dressing said wheel during the indexing movement in the other direction.

15. In a machine of the class described, in combination, a slide mounted for reciprocation in one direction, a slide mounted for reciprocation on said first mentioned slide at right angles thereto, means for reciprocating one of said slides, means for feeding the other of said slides, and means automatically operable by said last mentioned slide to reverse its movements and to render said first mentioned means inoperable during movement of said last mentioned slide in one direction.

16. The method of grinding a V-shaped notch comprising feeding the grinding wheel by increments into the work, dressing the inclined sides of the grinding wheel after each feeding movement to limit the latter to the desired contour to be ground, and dressing the periphery of the grinding wheel when the latter has been fed to the desired depth to limit the depth of the cut, said grinding wheel thus approaching in the course of the grinding operation from a blunt contour of the desired contour.

17. A grinding machine having, in combination, a grinding wheel, a support for a piece of work, means for automatically effecting a relative reciprocation between the wheel and the work, means for automatically effecting an indexing movement between said wheel and the work across the work, and means for automatically effecting a relative change of position between the wheel and the work by a simultaneous approaching feed and a dressing movement during said indexing movement in one direction.

18. The method of grinding a V-shaped notch comprising feeding the grinding wheel by increments into the work, dressing the sides of the grinding wheel angularly with respect to its axis after each feeding movement to progressively limit the latter to the ultimate contour to be ground, and dressing the periphery of the grinding wheel relative to the work to determine the depth of cut thereby progressively forming a V-shaped notch.

19. In a grinding machine, in combination, a base, a table mounted on said base for reciprocation in two mutually perpendicular directions, a block on the underside of said table having an elongated groove extending in one of said directions, a lever pivoted on said base transversely of said groove and having a bearing engagement at one end in said groove, a rotary cam having a dwell portion, means coacting with said cam and connected to said lever to oscillate the latter and thereby reciprocate said table in the other of said directions, means for reciprocating said table in said first mentioned direction, and clutch means automatically operable to render said cam inoperable during one stroke of each double reciprocation of said table in said first mentioned direction.

20. In a grinding machine, in combination, a base, a table mounted on said base for reciprocation in two mutually perpendicular directions, means for reciprocating said table in one of said directions with a dwell at one end of the reciprocation, said means having a spline driving connection with said table permitting reciprocation in the other of said directions, means for automatically reciprocating said table in said other perpendicular direction, and clutch means for said first two mentioned means operable to render said first mentioned means inoperable with the table in its dwell position during one stroke of each double reciprocation of said table in said perpendicular direction.

21. In a grinding machine, in combination, a base, a table reciprocable on said base, means for reciprocating said table, said means including a reversing control element, pneumatic actuating means for said element, said actuating means including a reversible pressure fluid valve, spring means tending to move said valve into one operative position, abutment means mounted on said table for movement into coacting relation with said valve at one end of the table reciprocation to move said valve into the other operative position, spring detent means operable to retain said valve in said last mentioned position, and abutment means mounted on said table for movement into coacting relation with said detent means at the other end of said reciprocation to release said valve for movement into the first mentioned operative position.

22. In a grinding machine, in combination, a base, a table mounted for reversible movement on said base, a drive connection including a gear operatively connected to said table, a gear train including a mutilated gear, a drive shaft, a reversible clutch for connecting said drive shaft selectively to said first mentioned gear to drive said table continuously in one direction or to said gear train to rotate said mutilated gear continuously, an indexing gear mounted for engagement by said mutilated gear for a portion of each revolution of the latter, a one-way clutch for connecting said indexing gear to said drive connection when said first mentioned clutch is positioned to connect said mutilated gear to said drive shaft to drive said table in a step-by-step movement in the other direction, and means automatically operable at each end of the table movement to actuate said clutches simultaneously into their alternate position.

23. In a grinding machine, in combination, a base, a table reciprocable on said base, feed means including a gear adapted to be operatively connected to said table, a locking element rigid with said gear, spring actuated detent means normally movable to engage said element to lock said gear in position, a mutilated drive gear positioned to mesh during a portion of each revolution with said first mentioned gear, cam means rigid with said drive gear and coacting with said detent means to withhold the latter from said element when said gears are in mesh, and means for driving said mutilated gear.

24. A grinding machine having, in combination, a base, a grinding wheel mounted on said base, a support for a piece of work on said base, means for effecting a relative rectilinear grinding traverse between said wheel and said support in one direction, means for automatically effecting a step-by-step indexing movement between said wheel and said support in a direction perpendicular to said first mentioned direction, and means responsive to said indexing movement for automatically adjusting said support relative to said wheel in predetermined relation to said indexing movement and in a direction perpendicular to said two first mentioned directions.

25. A grinding machine having, in combination, a base, a grinding wheel on said base, a work support, means for automatically effecting a relative rectilinear reciprocation between said wheel and said support to grind the work in a predetermined plane, means for automatically effecting a uniform step-by-step indexing movement between said wheel and said support in one direction transversely of said reciprocation, and means for automatically adjusting said support in a uniform step-by-step movement progressively in one direction, the steps of said indexing movement and the adjusting movement being concurrent to move successive points on the work into said plane for operative engagement by said wheel.

26. A grinding machine having, in combination, a base, a grinding wheel mounted on said base, a work support on said base, means for automatically effecting a relative working reciprocation between said wheel and the work, means for automatically effecting an indexing reciprocation between said wheel and the work transversely of said working reciprocation, each stroke of such indexing reciprocation in one direction being step-by-step and each stroke in the opposite direction being continuous, means for automatically adjusting the relative position of said wheel and the work in timed relation to each step-by-step movement, and means for automatically effecting a relative approaching feed between said wheel and the work after various timed step-by-step movements.

27. A grinding machine having, in combination, a grinding wheel, a support for a piece of work, means for effecting a relative reciprocation between said wheel and the work, means for effecting a relative step-by-step indexing movement in one direction between said wheel and the work during said reciprocatory movement, means for effecting an automatic return indexing movement after the completion of said step-by-step indexing movement, and means for effecting an automatic relative approaching feed between said wheel and the work during said return indexing movement.

JOHN EDGAR.